May 15, 1923.

J. R. TUCKER ET AL 1,455,236

AUTOMOBILE SPRING TIRE

Filed April 22, 1920

Inventor
J. R. Tucker
E. M. Ayers
By Chandler & Chandler
Attorneys

Patented May 15, 1923.

1,455,236

UNITED STATES PATENT OFFICE.

JAMES R. TUCKER AND EUGENE M. AYERS, OF BALTIMORE, MARYLAND.

AUTOMOBILE SPRING TIRE.

Application filed April 22, 1920. Serial No. 375,313.

*To all whom it may concern:*

Be it known that we, JAMES R. TUCKER and EUGENE M. AYERS, citizens of the United States, residing at Baltimore, in the county of Baltimore, State of Maryland, have invented certain new and useful Improvements in Automobile Spring Tires; and we do hereby declare the following to be a full, clear, and exact description of the invention, such as will enable others skilled in the art to which it appertains, to make and use the same.

This invention relates to an improved resilient wheel construction and one object of the invention is to provide improved resilient means for yieldably retaining the tire carrying rim out of engagement with the wheel felloe and to further so construct this improved wheel that the tire carrying rim may have sufficient movement to permit the springs to take up the shocks received in going over rough places in a road.

Another object of the invention is to so construct the improved resilient rim spacing elements that they may be mounted in sockets formed in the felloe and to so mount them that they may be drawn inwardly towards the felloe to an inoperative position when it is desired to remove the tire carrying rim for any purpose desired.

Another object of the invention is to provide an improved type of spring-carrying cup into which the stem of the rim-engaging plate extends with the spring positioned in the cup about the stem.

Another object of the invention is to so construct this device that it will consist of a comparatively few number of parts, all of which will be simple in construction and very strong and durable.

This invention is illustrated in the accompanying drawings wherein:—

Figure 1:
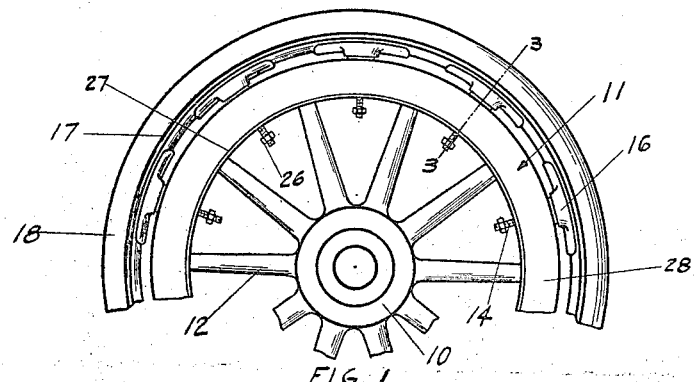
Figure 1 is a view showing the improved wheel in side elevation.
Figure 2:
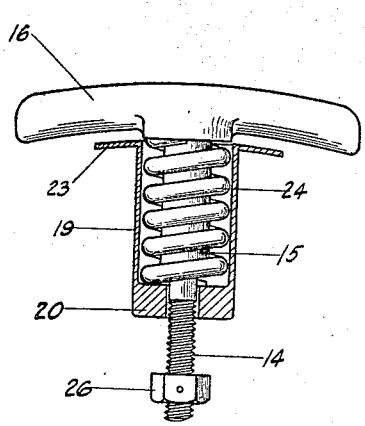
Figure 2 is a view showing one of the rim spacing elements in vertical section.
Figure 4:
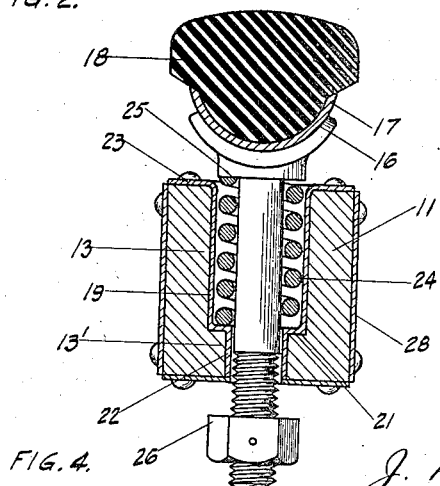
Figure 4 is a view similar to Figure 3 showing a slightly modified construction.

In this construction the wheel is provided with the usual hub 10, and felloe 11 positioned about the hub with the spokes 12 extending from the hub to the felloe. This felloe is provided at points positioned intermediate the spokes with sockets 13 having reduced inner ends 13′ through which the reduced threaded end portions 14 of the stems 15 of the rim saddles 16 will pass. These saddles engage the rim 17 upon which the tire 18 fits and are curved longitudinally and transversely so that they may have proper engagement with the rim. In each of the sockets 13 there is provided a cup 19 which may have its inner end portion inwardly thickened to provide an abutment head 20, as shown in Figure 2, or may have its inner end portion provided with an inwardly extending flange or head 21 from which extends a neck 22 passing through the reduced inner end portion 13′ of the socket 13, as shown in Figure 4. A plate 23 is provided at the outer end of the socket or cup 19 and fits against and is secured to the felloe 11 so that the cup will be securely held in place.

It is desired to have the rim engaging saddles held in firm engagement with the rim but permit these saddles to be moved out of engagement with the rim when desired and also permit the rim to have a certain amount of movement independent of the saddles. In order to accomplish this object there has been provided in each of the cups 19 a spring 24 which is coiled about the stem and has its inner end engaging the head at the inner end of the cup and its outer end engaging the shoulder 25 at the outer end of the stem. It will thus be seen that the springs will serve to yieldably hold the saddles in firm engagement with the tire carrying rim but permit the saddles to be moved out of engagement with the rim when desired. A nut 26 is screwed upon the threaded end portion of each of these stems and serves as means for drawing the stems inwardly to move the saddles inwardly against the action of the springs when the nuts are turned upon the stems and brought into engagement with the rim so that the rim 17 may be removed from the saddles. Reinforcing strips 27 are provided upon the inner periphery of the felloe for engagement by the nuts 26 and to strengthen the felloe and as additional means for strengthening the felloe there have been provided bands 28 secured to the side faces of the felloe. It should be noted that the fasteners for the bands 27 may pass entirely through the felloe and serve as means for holding the plates 23 in engagement with the felloe, When this wheel is in use it is assembled as shown and the rim engaging saddles will hold the tire carrying rim in spaced relation to the felloe. As the wheel revolves in passing over a road the springs will be compressed and will take up any shocks received in passing over rough places in the road. In view of the fact that the tire carrying rim is not rigidly connected with the saddles, the rim may have slipping movement with respect to the saddles at the sides of the wheel when the springs at the lower portion of the wheel are compressed. When these lower springs are compressed to take up jars received the upper springs will tend to expand and therefore the saddles will at all times be held in proper engagement with the rim and the rim prevented from slipping off of the saddles. These saddles will have very firm engagement with the rim and therefore, although the rim may have sufficient movement to permit the springs to operate properly, it may not have independent rotary movement about the felloe which would permit the felloe to slip within the rim and prevent proper turning of the wheel. When it is desired to remove the rim for the purpose of repairing the rim or to the felloe or spacing element, it is simply necessary to tighten the nuts 26 and the saddles will be drawn inwardly towards the felloe against the action of the springs 24. This will release the rim and permit of its bodily removal from the felloe. After the necessary repair has been made the rim will be put back in place and the nut loosened thus permitting the springs to expand and return the saddles into tight engagement with the rim. An improved wheel construction has thus been provided which is very efficient in operation and at the same time simple in construction and so constructed that it will be strong and durable and not liable to readily break or get out of order.

Figure 3:
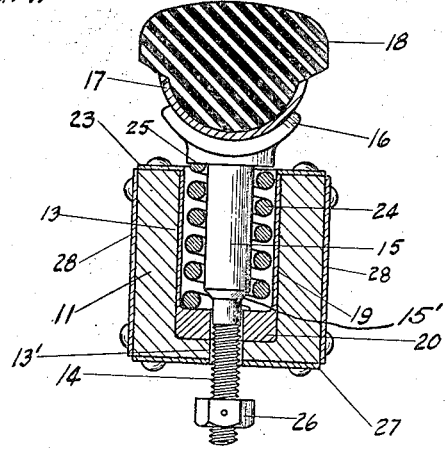
Figure 3 is a transverse sectional view taken along the line 3—3 of Figure 1.

It will be noted, upon reference to Figure 3, that the stem 15 is formed with a bevel shoulder 15', which is adapted to seat against the abutment head 20, so that the stems, when on the lower side of the wheel, cannot be pushed inwardly far enough to permit the accidental displacement of the rim 16 from the saddles.

What is claimed is:

A spring device for a wheel comprising a socket member having an opening in the bottom thereof, the open end of the socket having attaching flanges, a bolt disposed longitudinally through the socket member and through the bottom opening thereof, the outer end of the bolt having a transverse head which is arcuate longitudinally and transversely and provided with a shoulder surrounding the bolt at its junction with the head, and a coil spring encircling the bolt, within the socket, and bearing against said shoulder and the bottom of the socket.

In testimony whereof we affix our signatures, in the presence of two witnesses.

JAMES R. TUCKER.
EUGENE M. AYERS.

Witnesses:
Mrs. KATHARINE KIRBY.
J. ALOYS. KIRBY.